United States Patent [19]

Kawamura et al.

[11] 4,256,495
[45] Mar. 17, 1981

[54] SEALING GLASS

[75] Inventors: Hiromitsu Kawamura; Akira Misumi, both of Mobara; Kozo Odawara, Chiba, all of Japan

[73] Assignee: Hitachi, Ltd., Tokyo, Japan

[21] Appl. No.: 63,618

[22] Filed: Aug. 3, 1979

Related U.S. Application Data

[63] Continuation of Ser. No. 910,531, May 30, 1978, abandoned.

[30] Foreign Application Priority Data

Sep. 21, 1977 [JP] Japan .................. 52-112685

[51] Int. Cl.³ .............................................. C03C 3/10
[52] U.S. Cl. ................................... 106/53; 106/47 R
[58] Field of Search ................................ 106/47 R, 53

[56] References Cited

U.S. PATENT DOCUMENTS

| | | | |
|---|---|---|---|
| 3,080,328 | 3/1963 | Billian | 106/53 |
| 3,291,586 | 12/1966 | Chapman, Jr. et al. | 106/47 R |
| 3,841,883 | 10/1974 | Sherk et al. | 106/53 |
| 3,873,330 | 3/1975 | Sherk et al. | 106/47 R |
| 3,963,505 | 6/1976 | Dumesnil et al. | 106/53 |

OTHER PUBLICATIONS

"Reference Data for Radio Engineers", pp. 4-21, 4-22, 4-28 & 4-29 (6th Ed. 1975).
Ramsey, T., "Thermal and X-Ray Analyses of Some Electronic Package Sealing Glasses", Ceramic Bulletin, vol. 50, No. 8 (1971) pp. 671-675.

Primary Examiner—Herbert T. Carter
Assistant Examiner—Mark Bell
Attorney, Agent, or Firm—Charles E. Pfund

[57] ABSTRACT

A non-conductive sealing glass consists of 100 parts by weight of a composition containing 20-30 mole % of $B_2O_3$, 60-69 mole % of PbO, 0-10 mole % of ZnO, 0-6 mole % of CuO and 0.5-2.0 mole % of $Bi_2O_3$; and 1-5 parts by weight of either one or both of $SiO_2$ and $Al_2O_3$. The sealing glass is suitable for bonding together and sealing soda-lime-silica glass plates utilized to manufacture panel display devices.

2 Claims, 1 Drawing Figure

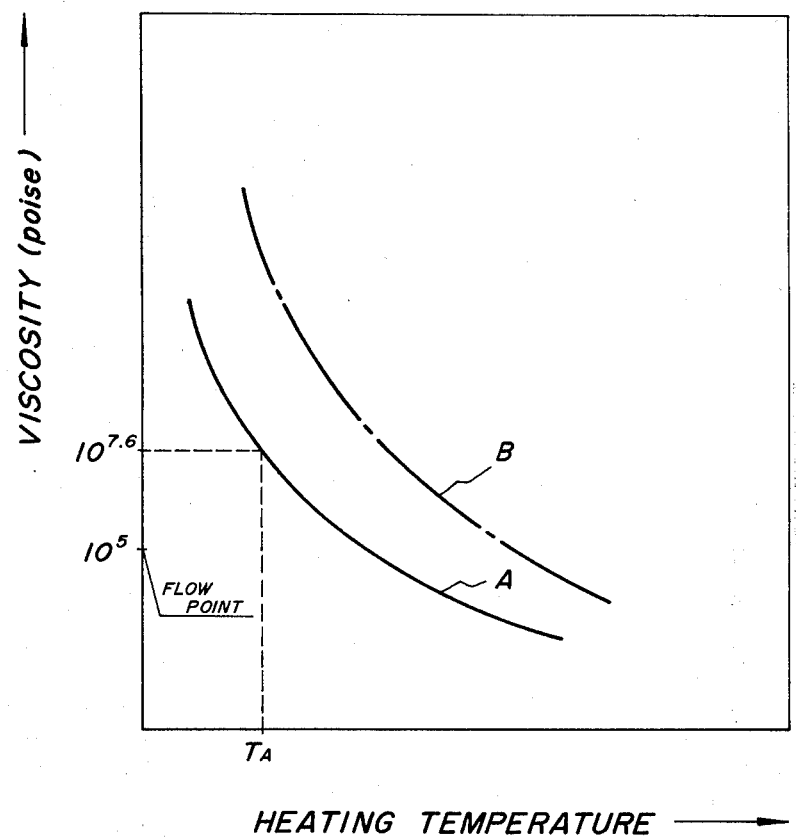

SEALING GLASS

This is a continuation of application Ser. No. 910,531, filed May 30, 1978, now abandoned.

BACKGROUND OF THE INVENTION

This invention relates to sealing glass suitable for fusing together soda-lime-silica glass at low temperatures.

Recently, many types of panel display devices utilizing gas discharge, fluorescence and liquid crystal have been developed and manufactured. In such display devices, panel units are generally used wherein a plurality of glass plates are disposed to oppose each other with a predetermined spacing therebetween and the peripheries of the glass plates are properly sealed. From the standpoint of price, the glass plates of the panel unit are generally made of soda-lime-silica glass and their surfaces are covered with transparent electroconductive films or subjected to desired surface treatment. Many types of excellent organic binders have been used in most cases. However, where an organic binder is used for the panel of the liquid crystal display device, an active gas evolved in the package from the binder or moisture contained in air leaked into the package through the binder chemically reacts with the liquid crystal, thus impairing its characteristics. For this reason, where a high degree of reliability is desired, it is necessary to fuse together the glass plates with inorganic low melting point glass free from moisture absorbing characteristics.

In order to fuse and seal the peripheries of the glass plates of the panel unit without deteriorating the electrode films, surface treated films or the state of surface treated glass plates, it is advantageous that the sintering temperature utilizing in the fusion operation should be less than 400° C. and that the thermal expansion coefficient ($\alpha$) of the sealing glass should be comparable with that of the glass plates.

Low melting point sealing glass for this purpose has been proposed, see, for example, Japanese patent publication No. 44-22189, Japanese laid open patent specification Nos. 50-44207 and 50-84614. The low melting glass disclosed in Japanese patent publication No. 44-22189 has a softening point lower than 400° C., but its thermal expansion coefficient differs greatly from $\alpha = 92 \times 10^{-7}/C.°$ of the soda-lime-silica glass so that it is impossible to manufacture high quality panel units. The sealing glasses disclosed in the other two references have high softening points so that it is impossible to use them at or below 400° C.

When one tries to lower the softening point of low melting glass, its thermal expansion coefficient generally tends to increase. However, when the difference in the thermal expansion coefficient between the soda-lime-silica glass ($\alpha = 92 \times 10^{-7}/C.°$) plates to be fused together and the sealing glass increases beyond a certain limit, the sealing glass would crack while the temperature is decreased from the fusion temperature to room temperature, owing to the difference in the contractions between the sealing glass and the glass plate. Accordingly, it is highly desirable to develop sealing glass that can decrease the difference in the thermal expansion coefficients and having a softening point less than 400° C.

SUMMARY OF THE INVENTION

Accordingly, the principal object of this invention is to provide an improved non-conductive sealing glass capable of fusing together ordinary soda-lime-silica glass plates at a low temperature of less than 400° C.

According to one aspect of this invention, there is provided a non-conductive sealing glass consisting of 100 parts by weight of a composition containing 20 to 30 mole % of $B_2O_3$, 60-69 mole % of PbO, 0-10 mole % of ZnO, 0-6 mole % of CuO and 0.5-2.0 mole % of $Bi_2O_3$; and 1-5 parts by weight of one of $SiO_2$ and $Al_2O_3$.

According to another aspect of this invention, there is provided sealing glass consisting of 100 parts by weight of a composition containing 20-30 mole % of $B_2O_3$, 60-69 mole % of PbO, 0-10 mole % of ZnO, 0-6 mole % of CuO and 0.5-2.0 mole % of $Bi_2O_3$; and 1-5 parts by weight of the sum of $SiO_2$ and $Al_2O_3$.

In the above compositions, the ranges of respective constituents have been determined for the following reasons.

More particularly, when the quantity of $B_2O_3$ is less than 20 mole %, the thermal expansion coefficient of the sealing glass increases and the sealing glass tends to devitrify. On the other hand, where the quantity of $B_2O_3$ is higher than 30 mole %, the viscosity of the sealing glass increases. When the quantity of PbO is less than 60 mole %, the viscosity increases with the result that the fusion temperature becomes higher than 400° C., whereas when the quantity of PbO is higher than 69 mole %, the thermal expansion coefficient increases and the sealing glass tends to devitrify. Although ZnO is effective to make the viscosity relatively low without increasing the thermal expansion coefficient, the sealing glass tends to devitrify when its quantity is higher than 10 mole %. Since the devitrification referred to herein is caused by polycrystals formed in the sealing glass, the devitrification increases apparent viscosity. While CuO is effective to improve the bonding power and to decrease thermal expansion coefficient, when it is used more than 6 mole %, the sealing glass tends to devitrify so that its optimum quantity ranges from 3 to 5 mole %, $Bi_2O_3$ is effective to prevent devitrification so that in the manufacture of the sealing glass of this invention, it is necessary to carefully control the quantity of $Bi_2O_3$. More particularly, with less than 0.5 mole % of $Bi_2O_3$, it is impossible to prevent devitrification whereas when the quantity of this constituent is higher than 2.0 mole %, the bonding temperature increases rapidly and the thermal expansion coefficient also increases. For this reason, only by so controlling the quantity of $Bi_2O_3$ as to be in the range of 0.5 to 2.0 mole %, the excellent characteristics contemplated by this invention can be provided. Both $SiO_2$ and $Al_2O_3$ are effective to prevent devitrification and to improve chemical durability and both manifest similar characteristics so long as they are incorporated in an amount of several percent. Accordingly, the quantity of $SiO_2$ and $Al_2O_3$ may be defined by the sum of them or by either one of them. The control of the quantity of $SiO_2$ and $Al_2O_3$ is important next to that of the quantity of $Bi_2O_3$. More particularly, when the quantity of the sum of $SiO_2$ and $Al_2O_3$ or either one of them is less than one part by weight, it is impossible to perfectly prevent devitrification and the viscosity increases. Especially, when fine powders of the sealing glass are remelted, it was found that the glass does not flow at all at 400° C. When either one or both of these constituents are incorporated by more than one part by weight, the flow characteristics can be improved greatly. Even when fine powders of the sealng glass were remelted, the flow characteristic was improved greatly. When the quantity of either one or both of $SiO_2$ and $Al_2O_3$ exceeds 5 parts by weight, the softening point of the glass rises and the viscosity increases.

BRIEF DESCRIPTION OF THE DRAWING

The single FIGURE is a graph showing the general characteristics of glass, especially the relationship between the viscosity and the softening point.

DESCRIPTION OF THE PREFERRED EMBODIMENTS

As is well known in the art, the softening point is defined as a temperature at which the viscosity becomes $10^{7.6}$ poise and the relationship between the viscosity and the softening point is shown by the graph shown in the accompanying drawing. The viscosity of a glass material shown by dot and dash lines B does not yet reach $10^{7.6}$ poise at the softening point $T_A$ of a glass material shown by a solid line A, thus meaning that material B is harder than material A. The flow point lies at a viscosity smaller than $10^{7.6}$ poise and corresponds to about $10^5$ poise.

Table 1 below shows the result of our experiment. Examples 1, 2 and 3 have compositions included in the ranges of this invention and show excellent results whereas examples 4 and 5 are control examples in which the quantity of $Bi_2O_3$ was excessive and $SiO_2$ and $Al_2O_3$ were not incorporated so that the object of this invention could not be attained. The raw materials were admixed according to the compositions shown in Table 1 and the compositions were heated to approximately 1100° C. to melt. From the molten glass, solid glass rods for measuring the thermal expansion coefficient were prepared and remaining portions were thrown into water to obtain coarse granules which in turn were crushed in a ball mill to obtain a fine powder having an average particle size of about 10 microns. The fine powder of each example was dry-pressed into a cylinder having a diameter of 12 mm and a length of 10 mm under prescribed conditions. After mounting on a glass plate, each cylinder was heated for 30 minutes at a temperature shown in Table 1. During this heat treatment the cylinder became round and the measured diameter thereof is shown in Table 1 as the flow button diameter.

TABLE 1

| Example number | | 1 | 2 | 3 | 4 | 5 |
|---|---|---|---|---|---|---|
| | | This invention | | | control | |
| Basic composition in mole % | $B_2O_3$ | 28 | 28 | 23 | 25 | 28 |
| | PbO | 66 | 61 | 66 | 61 | 61 |
| | ZnO | 0 | 5 | 5 | 5 | 5 |
| | CuO | 5 | 5 | 5 | 5 | 5 |
| | $Bi_2O_3$ | 1.0 | 1.0 | 1.0 | 4.0 | 1.0 |
| Parts by weight to be added to 100 parts by weight of basic composition | $SiO_2$ | 1.5 | 1.5 | 1.5 | 1.5 | 0 |
| | $Al_2O_3$ | 2.0 | 2.0 | 2.0 | 2.0 | 0 |
| $\alpha \times 10^{-7}/°C$. | | 109 | 104 | 110 | 115 | 103 |
| flow button dia. (mm) after heating for 30 min. at 400° C. | | 27 | 25 | 28 | 21 | 13 |
| flow button dia. (mm) after heating for 30 min. | | 22 | 23 | 23 | 20 | 12 |

TABLE 1-continued

| Example number | 1 | 2 | 3 | 4 | 5 |
|---|---|---|---|---|---|
| | This invention | | | control | |
| at 375° C. flow button dia. (mm) after heating for 30 min. at 350° C. | 18 | 18 | 18 | 17 | 12 |

The flow points of Examples 1 to 5 were as listed in Table II.

TABLE II

| Example number | 1 | 2 | 3 | 4 | 5 |
|---|---|---|---|---|---|
| flow point (°C.) | 375 | 380 | 370 | 405 | 450 |

In Table I, the greater the diameter of the button, the more improved is the flow characteristic. As a result of our research, it was found that good bonding was obtained when the diameter of the flow button is larger than 22 mm. In Examples 1 to 3 (the embodiments of this invention) the thermal expansion coefficient was relatively small, that is, (104 to 110)$\times 10^{-7}/°$ C. but the diameter of the flow button at 400° C. was sufficiently large showing good flow. Moreover, since the flow button has a diameter of more than 22 mm when heated for 30 minutes at 375° C., it is possible to perform bonding operations at 375° C. when the sealing glasses of Examples 1 to 3 are employed.

On the other hand, with the control example 4, although the thermal expansion coefficient has slightly increased to $115 \times 10^{-7}/°$ C., the diameter of the flow button is small showing that the flow at 400° C. is not good. In the control example 5 while, the thermal expansion coefficient $\alpha$ is sufficiently small, that is, $103 \times 10^{-7}/°$ C., the diameter of the flow button is only 13 mm showing that the flow property of this control example is poor. Comparing the composition of example 2 with control example 4, the quantity of $B_2O_3$ was decreased whereas the quantity of $Bi_2O_3$ was increased. However, the thermal expansion coefficient of this control example 4 is larger than that of example 2 and the diameter of the flow button has decreased. This is because the quantity of $Bi_2O_3$ is 4 mole % which is much larger than the upper limit 2.0 mole % of this invention, thereby causing the thermal expansion coefficient and viscosity to increase. The composition of the control example 5 corresponds to that of example 2 except $SiO_2$ and $Al_2O_3$ have been omitted. However, the glass of example 5 shows devitrification and did not flow at all, failing to fuse at a temperature of less than 400° C. Control example 4 and 5 are not suitable as described above whereas examples 1 to 3 having compositions included in the range of this invention flowed well at a temperature of 375°-400° C. and their thermal expansion coefficients were less than $110 \times 10^{-7}/°$ C. which does not cause any problem when they are bonded to soda-lime-silica glass plates.

Each example shown in Table I was pulverized into a fine powder having an average grain size of 10 microns and the powder was admixed with nitro-cellulose and dietnylene glycol monobutyl ether acetate to form a paste. This paste acting as sealing glass was coated on the periphery of a soda-lime-silica glass plate, and then another glass plate of the same type of glass was placed on the sealing glass. The assembly was dried and then heated for 30 minutes in a sintering furnace maintained at 400° C. The glass of examples 1 to 3 flowed well and perfectly bonded together the two glass plates, thus forming excellently sealed packages. Moreover, as the thermal expansion coefficients of these examples are only slightly higher than that of the glass plate, no cracks were formed.

Although the glass of control example 4 showed a slight flow, air gaps remained at portions not fused together, thus failing to form an airtight seal. Moreover, it was found that cracks were formed during storage. The glass of control example 5 had no bonding force so that even when the assembly was heated at a temperature of 400° C. for 30 minutes in a sintering furnace, the glass plates pealed off readily.

As described above, with the sealing glass of this invention, it is possible to perfectly fuse and seal commercial soda-lime-silica glass plates at a temperature of less than 400° C. without forming any crack. Accordingly it is possible to hermetically seal the glass plates without impairing the surface films formed thereon or the surface treating characteristics.

What is claimed is:

1. Non-conductive sealing glass of not greater than about $10\mu$ average grain diameter consisting of 100 parts by weight of a composition consisting of 20-30 mole % of $B_2O_3$, 60-69 mole % of PbO, 0-10 mole % of ZnO, 0-6 mole % of CuO and 0.5-2.0 mole % of $Bi_2O_3$; and 1-5 parts by weight of either one of $SiO_2$ and $Al_2O_3$.

2. Non-conductive sealing glass of not greater than about $10\mu$ average grain diameter consisting of 100 parts of weight of a composition consisting of 20-30 mole % of $B_2O_3$, 60-69 mole % of PbO, 0-10 mole % of ZnO, 0-6 mole % of CuO and 0.5-2.0 mole % of $Bi_2O_3$; and 1-5 parts by weight of the sum of $SiO_2$ and $Al_2O_3$.

* * * * *